United States Patent [19]

Rouhling

[11] Patent Number: 5,154,965
[45] Date of Patent: Oct. 13, 1992

[54] DEFORMABLE FABRIC FOR COMPOSITE MATERIALS

[75] Inventor: Jean A. M. Rouhling, Montbron, France

[73] Assignee: Scapa Group PLC, England

[21] Appl. No.: 643,534

[22] Filed: Jan. 18, 1991

[30] Foreign Application Priority Data

Jan. 20, 1990 [GB] United Kingdom ............... 9001358

[51] Int. Cl.$^5$ .................................. D03D 3/00
[52] U.S. Cl. .................... 428/229; 428/246; 428/257; 428/408; 428/902
[58] Field of Search ............ 428/280, 234, 300, 408, 428/902, 246, 257, 258, 254, 229

[56] References Cited

U.S. PATENT DOCUMENTS

| | | |
|---|---|---|
| 975,940 | 11/1910 | Fetterly . |
| 2,893,442 | 7/1959 | Genin . |
| 3,537,488 | 11/1970 | LeBoeuf . |
| 4,038,440 | 7/1977 | King . |
| 4,320,160 | 3/1982 | Nishimura et al. . |
| 4,569,883 | 2/1986 | Renjilian . |
| 4,636,426 | 1/1987 | Fleischer ............. 428/257 |
| 4,729,860 | 3/1988 | Leach . |
| 4,748,996 | 6/1988 | Combier . |
| 4,839,220 | 6/1989 | Stijntjes et al. ...... 428/257 |
| 4,854,352 | 8/1989 | Combier . |
| 4,906,506 | 3/1990 | Nishimura et al. .... 428/257 |
| 4,910,076 | 3/1990 | Ando et al. ......... 428/257 |

Primary Examiner—James J. Bell
Attorney, Agent, or Firm—Bell, Seltzer, Park & Gibson

[57] ABSTRACT

A deformable multi-layer fabric for use in forming heat resistant bodies is proposed which comprises a multi-layer fabric formed from carbon yarns, the yarns being provided in plural from in the warp and/or weft directions and preferably in plural form throughout the whole of the fabric. The warp yarns in each group C1-C12 exist in side-by-side disposition while the individual weft yarns of each group W1-W6 are subjected to a small degree of twist. The fabric is capable of ready deformation without cutting and facilitates the creation of complex shapes or profiles without reference to the warp direction thereof.

16 Claims, 4 Drawing Sheets

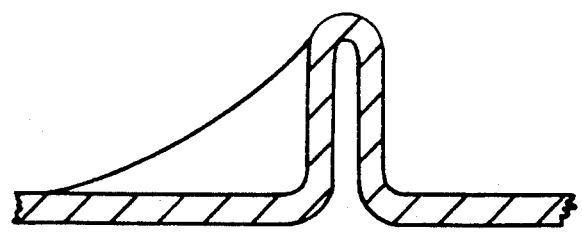
Fig. 4
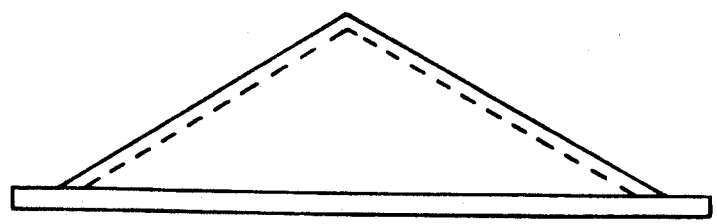
Fig. 5
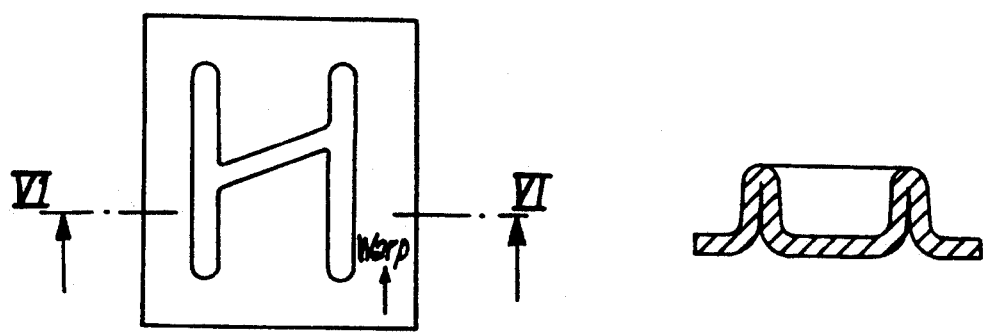
Fig. 6
Fig. 6a

DEFORMABLE FABRIC FOR COMPOSITE MATERIALS

The invention concerns deformable fabrics for composite materials, and has more particular reference to a deformable fabric of woven form for subsequent impregnation to give a composite structure, for example a rigid heat-resistant body.

The need exists in the aerospace, aeronautical or ballistic fields for reinforcing structures capable of use in forming heat-shields, nose cones and the like and which exhibit high strength characteristics in multiple directions even under extreme temperature conditions. Such structures need to have a high degree of uniformity and to be essentially free from voids. In addition, the structure should be deformable, so as readily to be brought to a shape appropriate to the intended form of the body of which it is to form a part.

The object of the present invention is to provide a fabric for use as aforesaid.

According to the present invention there is proposed a deformable fabric of woven form for use as a reinforcement in the production of composite materials, the fabric comprising multiple layers of warp and weft yarns interwoven together to define an integral multilayer structure, characterised in that the yarns comprise very strong textile filament, for example carbon yarns or ceramic yarns, and in that some at least of the yarns are provided in plural form.

According to a preferred feature, some at least of the warp yarns of at least some of the individual layers include warp yarns in plural form, corresponding plural groups of warp yarns existing in different selected fabric layers defining respective planes extending in the thickness direction of the fabric.

According to another preferred feature all of the warp yarns of at least one layer thereof are provided in plural form.

According to a further preferred feature, at least some of the weft yarns are also provided in plural form.

The invention will now be described further, by way of example only, with reference to the accompanying diagrammatic drawings in which:

FIG. 4 illustrates use of the fabric in producing a rigid body having mutually perpendicular ribs thereon;

FIG. 5 shows deformation of the fabric to tetrahedral or pyramidal form;

FIG. 6 is a plan view of a further profiled fabric having a rib formation thereon; and FIG. 6a is a section on line 6—6 of FIG. 6;

Figure 1:
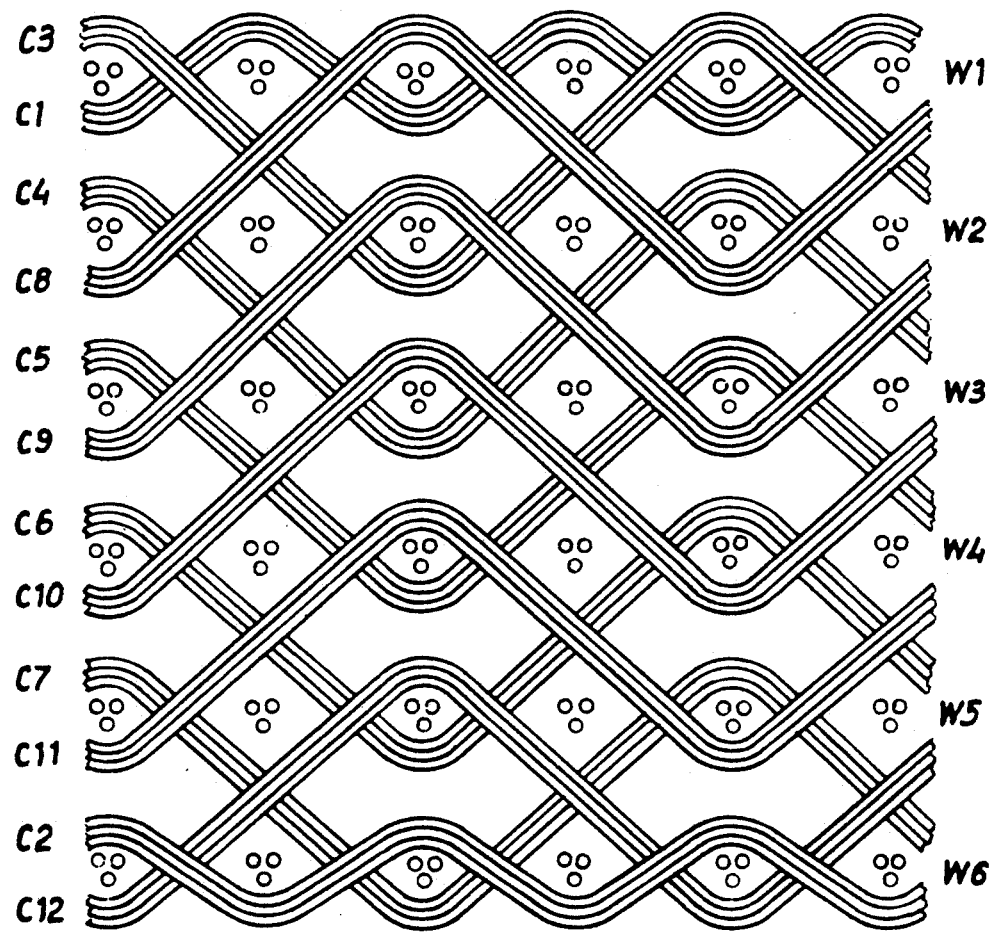
FIG. 1 illustrates a preferred form of weave structure for the deformable fabric of the invention.

Referring now to FIG. 1 of the drawings, a three-dimensional fabric comprises six layers W1-W6 of weft yarns woven together with twelve warp yarns C1-C12 to provide an integral deformable structure.

In both the warp and in the weft directions the yarns are grouped together in threes, the yarns of each warp group existing as individual yarns arranged in side-by-side disposition, whilst the individual yarns of each group of weft yarns are brought together with a small degree of twist.

In the weave pattern illustrated in FIG. 1, corresponding weft yarns (or yarn groups) of the individual layers thereof are stacked vertically and the pattern repeat, in the warp direction, extends over twenty-four weft groups. The individual groups are defined by three ends, each consisting of two strands of 66.5 Tex cabled together and twisted at sixty-four turns per meter to give a weft yarn of threefold character and comprising six strands.

The weft yarns are interwoven with warp yarn groups C1-C12, each warp group comprising three individual side-by-side yarns defined by two strands of 66.5 Tex cabled together. Alternatively a single end of 133 Tex may be used.

Of the total warp yarn groups C1 to C12, groups C3 to C7 are arranged to lie one above another in a first common plane, whilst yarn groups C8 to C12 lie one above another in a second, different common plane. Yarn groups C1 and C2 appear at the respective faces of the fabric, but neither possesses a coplanar relationship with the other. The pattern repeat in the weft direction comprises twelve warp yarns/groups.

On the basis of each warp yarn group comprising three individual yarns of each of 133 Tex and each weft group comprising three yarns of 133 Tex twisted together, the structure has 77.4 yarns per centimeter in both the warp and the weft direction, the overall thickness of the fabric being approximately 5 mms and the volume density being 0.414.

The warp and weft yarns are of a like material throughout the fabric, and all comprise stretch-broken carbon yarns, although other forms of multi-filament carbon or carbon precursor yarns or of ceramic yarns, or combinations thereof, or indeed of other yarns of very strong textile filaments, may be used in the warp and/or weft directions.

It has been found that yarns of the multiple groups shift on deformation of the fabric to bring the same into a shape appropriate to the body to be formed, the possibility of relative lateral movement between the individual yarns within a group being thought to facilitate such shift and enabling complex shapes to be created without prejudice to the reinforcement capability of the structure.

In use in forming a heat resistant body the reinforcement as aforesaid is brought to an appropriate shape by deformation as necessary and an appropriate binder material is deposited thereon by impregnation (the liquid method) or by permeation (the gas method). In the presence instance the gas method is employed, the reinforcement being placed in an enclosure at fixed temperature and pressure and is subjected to a gas flow, the gas being such that carbon is deposited on the filaments on contact therewith to give a carbon/carbon structure.

The fabric as aforesaid is of ready use in the production of reinforced bodies of complex shape, typical of the forms assumed by the reinforcement being those shown in FIGS. 2 to 8.

Figure 2:
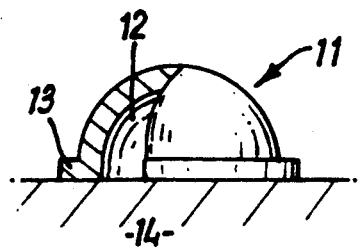
FIG. 2 shows the fabric of the present invention as used in the production of a flanged body of hemispherical form.

As is shown in FIG. 2, in producing a flanged hemispherical shell the reinforcement 11 is draped over a hemisphere 12 of an appropriate diameter, the edge 13 of the reinforcement being laid flat on a platen 14 from which the shaped former 12 extends, the fabric retaining its deformed shape, and being impregnated with a thermo-setting resin which is then cured. We have found that the reinforcement as above described is of ready application to the production of flanged hemispherical shells of a diameter of as little as, say, 100 mm.

Figure 3:
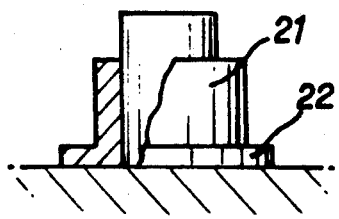
FIG. 3 is a view corresponding to FIG. 2, and shows use of the fabric in producing a sleeve having a radial flange at an end thereof.

FIG. 3 illustrates a reinforcement comprising a sleeve 21 having a radial flange 22 at an end thereof.

The deformation characteristics of the fabric are such as to fit the same for use in producing bodies of complex shape without the need to make incisions in the fabric, typical shapes being those shown in FIGS. 4 to 8. As is apparent from, say, FIG. 4, any requisite disposition of ribs, say of a height of 50 mm, may be achieved in a deformed fabric without reference to the warp direction of the fabric.

Figure 7A:
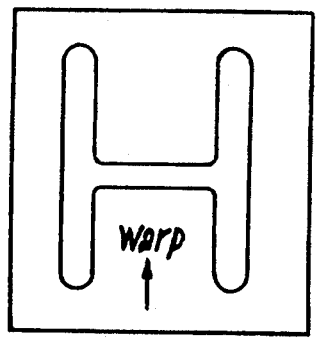
FIGS. 7a, 7b, 7c are views corresponding to FIG. 6 and show other profiles attainable by the fabric.
Figure 7B:
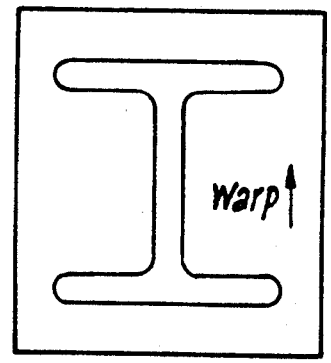
Figure 7C:
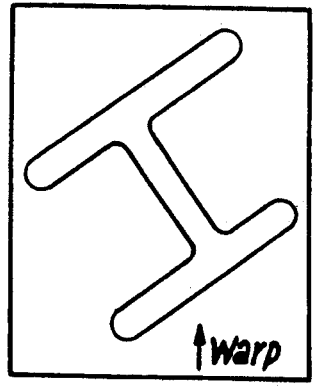

FIG. 5 shows fabric deformation to give a tetrahedral or pyramidal form, whilst FIGS. 6 and 7 show typical profiled fabrics having upstanding ribs thereon.

Figure 8:
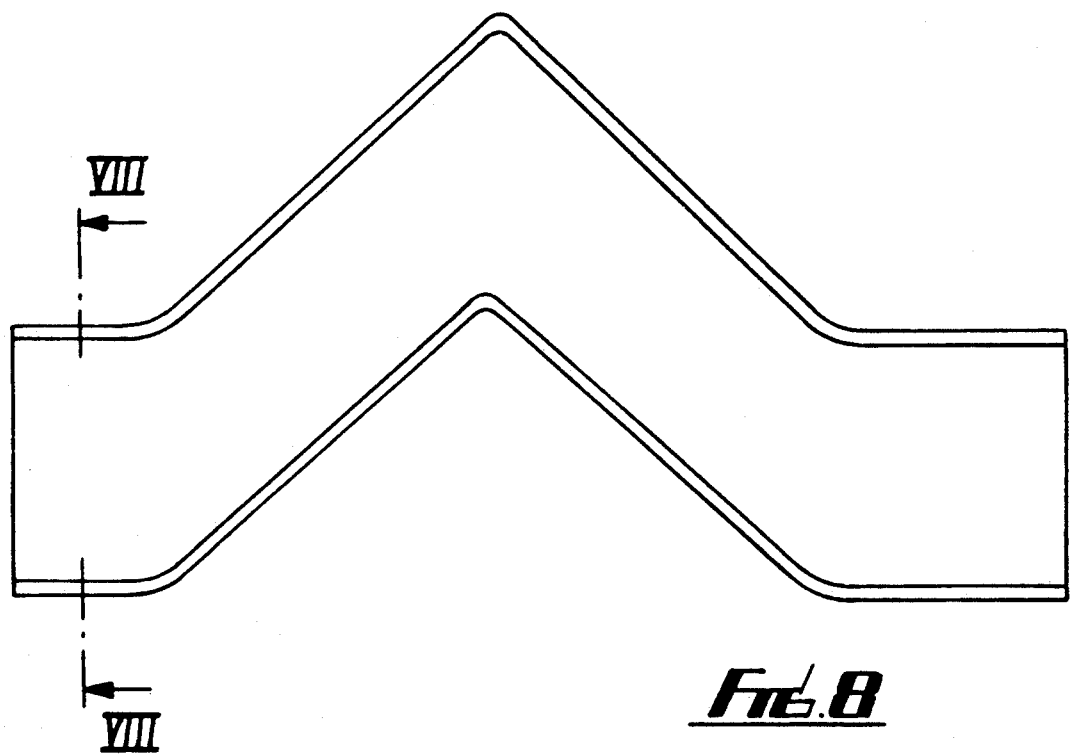
FIGS. 8 and 8a show a plan view and a section on line VIII—VIII of FIG. 8 respectively.
Figure 8A:
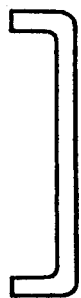

FIG. 8 illustrates the manner in which a straight strip of fabric constructed in accordance with the invention is capable of distortion within a plane to bring the same into non-linear form, for example as shown, and of further distortion to provide flanges at the longitudinal edges.

The invention is not restricted to the detail of the embodiment hereinbefore described, either as regards the weave structure, the yarn groupings or the nature of the yarns. Furthermore, alternative binders to a thermo-setting resin may be used according to the specific circumstances and intended end use of the body, and, in addition to organic resins, refractory products or metals are of relevance in this regard.

Composite materials of the kind to which the invention relates may require reinforcing fabrics of a thickness of between several millimeters and several tens of millimeters according to the nature of the rigid body to be formed, and the invention enables the production of such fabrics using relatively thin yarns, the number of layers of weft yarns being selected according, inter alia, to the required thickness of the reinforcement. The fabric of the invention, by virtue of having been woven in multi-layer form, offers the advantage of being free from risk of delamination.

The particular weave structure adopted may differ from that shown, and it is envisaged that the invention will be of application to many conventional weave patterns.

The number of individual yarns in each grouping may be more or less than three, and it is possible to vary the nature of the groupings, both as to their form and to the number of yarns, throughout the fabric and particularly in the thickness direction thereof. Each grouping may, if desired, contain individual yarns of different respective characteristics as regards their thickness, material and properties, and the warp and weft yarns and their groupings may also differ.

Whilst the preferred warp yarn is a stretch-broken multi-filament carbon yarn, other carbon yarns, may be used if preferred. Indeed, the invention is not limited to the use of carbon yarns, and other yarns comprising very strong textile filaments, such as for example, ceramic yarns, polyacrylonitrile (PAN) precursor, zirconium whiskers and silicon carbide yarns may be used.

The warp yarns will ordinarily be multifilament in character but such yarns may be other than stretch-broken, that is to say other than yarns created by "cracking" brittle multifilament yarns and then spinning such yarns to yield a yarn of improved flexibility with respect to its multifilament precursor. Continuous filament yarns are thought to be of use in the context of the invention, as too are such as spun yarns. Mixtures, whether continuous filament or otherwise, of different yarns may be used, and twisted yarns or cored yarns may also be of application.

It is also to be understood that, if desirable, the fabric, which fabric is of application in planar or substantially planar form, may be sewn to maintain particular features produced by deformation, for example ridges of the kind shown in FIGS. 4 and 6a.

The fabric may be subjected to compression to bring the filaments closer together, and/or may, in some situations, be combined with a carbon-fibre or like batt needled to one or both surfaces thereof, subject to the dimensions and characteristics of the batt not adversely affecting the deformability of the structure.

What is claimed is:

1. A deformable woven fabric for use as a reinforcement in the production of composite materials, the fabric comprising multiple layers of woven warp and weft yarns to define an integral multi-layer structure, characterized in that the yarns are of carbon, ceramic or other very strong textile filaments and at least some of the individual warp and weft yarns are provided in plural form.

2. A deformable fabric as claimed in claim 1, wherein all of the individual warp yarns in at least one warp layer are provided in plural form.

3. A deformable fabric as claimed in claim 1 or 2, wherein all of the individual warp yarns and all of the individual weft yarns in at least one fabric layer are provided in plural form.

4. A deformable fabric as claimed in claim 1, wherein some at least of the individual warp yarns of at least some of the individual layers include warp yarns in plural form, corresponding plural groups of warp yarns existing in different selected individual fabric layers defining respective planes extending in the thickness direction of the fabric.

5. A deformable fabric as claimed in claim 4, wherein further plural groups of warp yarns exist at the respective faces of the fabric and weave with weft yarns only at those faces, corresponding said further plural groups at the said respective faces lying outside the said respective planes.

6. A deformable fabric as claimed in claim 4, wherein corresponding warp yarn groups of plural fabric layers existing inwardly of the fabric define respective common planes.

7. A deformable fabric as claimed in claim 5, wherein corresponding warp yarn groups of plural fabric layers existing inwardly of the fabric define respective common planes.

8. A deformable fabric as claimed in claim 1, wherein at least some of the individual weft yarns are provided in plural form.

9. A deformable fabric as claimed in claim 1, wherein the individual warp and weft yarns are provided in plural form throughout the whole of the fabric.

10. A deformable fabric as claimed in claim 1, wherein the individual weft yarns of a plural group thereof are twisted together.

11. A deformable fabric as claimed in claim 1, wherein the individual warp yarns of a plural group thereof exist in untwisted side-by-side disposition.

12. A deformable fabric as claimed in claim 4, wherein the individual warp yarns of a plural group thereof exist in untwisted side-by-side disposition.

13. A deformable fabric as claimed in claim 1, wherein the warp and weft yarns are of like material throughout the fabric.

14. A deformable fabric as claimed in claim 4, wherein the warp and weft yarns are of like material throughout the fabric.

15. A deformable fabric as claimed in claim 1, wherein the yarns are selected from the group comprising multifilament carbon, carbon precursor or ceramic yarns.

16. A deformable fabric as claimed in claim 15, wherein the multi-filament yarns are stretch-broken yarns.

* * * * *